(12) United States Patent
Cardona

(10) Patent No.: US 6,602,063 B1
(45) Date of Patent: Aug. 5, 2003

(54) DISCONTINUOUS BLOWING AGENT DELIVERY SYSTEM AND METHOD

(75) Inventor: Juan C. Cardona, Lowell, MA (US)

(73) Assignee: Trexel, Inc., Woburn, MA (US)

( * ) Notice: Subject to any disclaimer, the term of this patent is extended or adjusted under 35 U.S.C. 154(b) by 144 days.

(21) Appl. No.: 09/621,262

(22) Filed: Jul. 21, 2000

(51) Int. Cl.$^7$ .............................................. B29C 44/38
(52) U.S. Cl. ...................... 425/4 R; 425/135; 425/143; 425/148; 425/557
(58) Field of Search ............................ 425/4 C, 817 C, 425/532, 135, 143, 4 R, 817 R, 148, 557

(56) References Cited

U.S. PATENT DOCUMENTS

| | | | |
|---|---|---|---|
| 3,686,388 A | | 8/1972 | Beckmann et al. |
| 3,697,204 A | | 10/1972 | Kyritsis et al. |
| 3,793,416 A | | 2/1974 | Finkmann et al. |
| 3,856,442 A | * | 12/1974 | Gallagher et al. .......... 425/4 C |
| 4,043,715 A | | 8/1977 | Hendry |
| 4,153,408 A | * | 5/1979 | Albert et al. ................ 425/532 |
| 4,211,523 A | * | 7/1980 | Hunerberg .................. 425/4 C |
| 4,344,710 A | | 8/1982 | Johnson et al. |
| 4,381,272 A | | 4/1983 | Ehritt |
| 4,424,287 A | | 1/1984 | Johnson et al. |
| 4,470,938 A | * | 9/1984 | Johnson ........................ 264/50 |
| 4,473,665 A | | 9/1984 | Martini-Vvedensky et al. |
| 4,783,292 A | | 11/1988 | Rogers |
| 5,047,183 A | | 9/1991 | Eckardt et al. |
| 5,098,267 A | | 3/1992 | Cheng |
| 5,120,559 A | | 6/1992 | Rizvi et al. |
| 5,154,088 A | | 10/1992 | Lehnert et al. |
| 5,158,986 A | | 10/1992 | Cha et al. |
| 5,160,674 A | | 11/1992 | Colton et al. |
| 5,328,651 A | | 7/1994 | Gallagher et al. |
| 5,334,356 A | | 8/1994 | Baldwin et al. |
| 5,866,053 A | | 2/1999 | Park et al. |
| 6,005,013 A | | 12/1999 | Suh et al. |
| 6,169,122 B1 | | 1/2001 | Blizard et al. |
| 6,231,942 B1 | | 5/2001 | Blizard et al. |
| 6,235,380 B1 | | 5/2001 | Tupil et al. |
| 6,284,810 B1 | | 9/2001 | Burnham et al. |
| 6,287,494 B1 | | 9/2001 | Clarke |
| 6,322,347 B1 | | 11/2001 | Xu |
| 6,328,916 B1 | | 12/2001 | Nishikawa et al. |
| 6,376,059 B1 | | 4/2002 | Anderson et al. |
| 6,451,230 B1 | | 9/2002 | Eckardt et al. |

FOREIGN PATENT DOCUMENTS

| | | | |
|---|---|---|---|
| EP | 0 441 762 | * | 8/1991 |
| EP | 0 843 246 B1 | | 11/1997 |
| EP | 0 843 246 A2 | | 11/1997 |
| EP | 0 972 626 A2 | | 1/2000 |
| FR | 2 563 836 | * | 11/1985 |
| KR | 2000-0032383 | | 6/2000 |
| WO | WO 9808667 | | 3/1998 |
| WO | WO 9831521 | | 7/1998 |

* cited by examiner

Primary Examiner—Allan R. Kuhns
(74) Attorney, Agent, or Firm—Wolf, Greenfield & Sacks, P.C.

(57) ABSTRACT

The invention provides a blowing agent delivery system and method for introducing a blowing agent into a polymeric foam processing system. The delivery system is designed to introduce blowing agent into polymeric material within an extruder when polymeric material is being plasticated, for example, during the plastication period of an injection molding cycle. The rate of introduction of blowing agent into polymeric material may be coupled to the flow rate of polymeric material in the extruder to ensure precise control over blowing agent percentage in the resulting mixture of polymeric material and blowing agent. The delivery system is also designed to prevent the introduction of blowing agent into the polymeric material when polymeric material is not being plasticated, for example, during the injection period of an injection molding cycle. The delivery system may be used in conjunction with discontinuous systems including injection molding or blow molding systems.

18 Claims, 5 Drawing Sheets

DISCONTINUOUS BLOWING AGENT DELIVERY SYSTEM AND METHOD

FIELD OF THE INVENTION

The present invention relates generally to polymer foam processing and, more particularly, to a system and method for delivering blowing agent in a polymeric foam process.

BACKGROUND OF THE INVENTION

Polymeric materials are processed using a variety of techniques. Many techniques employ an extruder which includes a polymer processing screw that rotates within a barrel to plasticate polymeric material. Some processing techniques, such as injection molding and blow molding, may be discontinuous. That is, during operation, the screw does not plasticate polymeric material continuously. Discontinuous processes may be repetitive cycles which include a plastication period, in which the screw rotates and polymeric material is accumulated, followed by an injection (or ejection) period, in which the screw does not rotate and the accumulated polymeric material is injected into a mold (or ejected through a die).

Polymeric foam materials, including microcellular materials, may be processed by injecting a physical blowing agent into the polymeric material within the extruder through a blowing agent port in the barrel. Many conventional blowing agent delivery systems inject blowing agents continuously into the polymeric material within the barrel. In discontinuous processes, including certain injection molding and blow molding processes, such continuous delivery systems may cause a lack of control over the percentage of blowing agent injected into the polymeric material and may lead to an uneven distribution of the blowing agent in the polymeric material. In particular, the polymeric material in the vicinity of the blowing agent port, when the screw ceases to plasticate polymeric material, may contain higher amounts of blowing agent because of its increased residence time in proximity with the blowing agent injection port. The uneven distribution of blowing agent may result in viscosity variations within the polymeric material in the extruder which can cause output inconsistencies and other problems. Such effects may generally reduce control over the process and may narrow the processing window.

In some polymer processes, including some discontinuous processes, such conventional blowing agent delivery systems may be adequate. However, in other processes, such as discontinuous processes that require relatively precise control over blowing agent delivery, the conventional delivery systems may impair the process for one or more of the reasons described above. In particular, certain processes for producing microcellular foam may be adversely affected if the blowing agent is not precisely controlled.

Accordingly, a need exists for a system that delivers blowing agent in a controlled manner to a discontinuous polymer processing system.

SUMMARY OF THE INVENTION

The invention provides a blowing agent delivery system and method for introducing a blowing agent into a polymeric foam processing system. The delivery system is designed to introduce blowing agent into polymeric material within an extruder when polymeric material is being plasticated, for example, during the plastication period of an injection molding cycle. The rate of introduction of blowing agent into polymeric material may be coupled to the flow rate of polymeric material in the extruder to ensure precise control over blowing agent percentage in the resulting mixture of polymeric material and blowing agent. The delivery system is also designed to prevent the introduction of blowing agent into the polymeric material when polymeric material is not being plasticated, for example, during the injection period of an injection molding cycle. The delivery system may be used in conjunction with discontinuous systems including injection molding or blow molding systems.

One aspect of the invention provides a polymeric foam processing system operable to, in a repetitive cycle, plasticate polymeric material and eject an accumulated mixture of polymeric material and blowing agent through an outlet. The system includes an extruder having a polymer processing screw constructed and arranged to rotate within a barrel, during a plastication period of the cycle, to convey polymeric material in a downstream direction at a flow rate within a polymer processing space defined between the screw and the barrel. The extruder includes a blowing agent port formed in the barrel. The system further includes a blowing agent delivery system having an outlet fluidly connected to the blowing agent port. The blowing agent delivery system is constructed and arranged to repeatedly introduce a fixed mass of blowing agent into the polymeric material in the polymer processing space, during the plastication period of the cycle, at a rate coupled to the flow rate of polymeric material, to form a mixture of polymeric material and blowing agent therein.

Another aspect of the invention provides a polymeric foam processing system. The system includes an extruder including a barrel having a blowing agent port. The barrel is constructed and arranged to mount therein a screw rotatable, in a first mode of operation, to convey polymeric material at a flow rate in a downstream direction within a polymer processing space defined between the screw and the barrel. The system further includes a chamber fluidly connectable to the blowing agent port. The chamber is constructed and arranged to confine a fixed amount of blowing agent in an enclosed volume. The system further includes a piston housed within the chamber and moveable, at a rate coupled to the flow rate of polymeric material, in a direction decreasing the enclosed volume to inject the fixed amount of blowing agent through the blowing agent port to form a mixture of polymeric material and blowing agent in the polymer processing space.

Another aspect of the invention provides a polymeric foam processing system operable to, in a repetitive cycle, plasticate polymeric material and eject an accumulated mixture of polymeric material and blowing agent through an outlet. The system includes an extruder having a polymer processing screw constructed and arranged to rotate within a barrel, during a plastication period of the cycle, to convey polymeric material in a downstream direction at a flow rate within a polymer processing space defined between the screw and the barrel. The extruder includes a blowing agent port formed in the barrel. The system further includes a blowing agent delivery system having an outlet fluidly connected to the blowing agent port. The blowing agent delivery system including a chamber designed to confine a fixed mass of blowing agent in an enclosed volume and a piston mounted within the chamber. The piston defining, in part, the enclosed volume of the chamber, and moveable from a first position to a second position to force blowing agent through the outlet of the chamber and the blowing agent port and into the polymeric material, during the plastication period, to form a mixture of polymeric material and blowing agent in the polymer processing space. The blowing agent delivery system being equipped to measure temperature and pressure of the blowing agent confined in the chamber. The system further including a controller in communication with the blowing agent delivery system. The controller designed to receive the inputs of the temperature and pressure of the blowing agent confined in the chamber from the blowing agent delivery system, and an input of a pre-determined mass of blowing agent. The controller being capable of calculating a pre-determined volume of blowing agent from the inputs. The controller designed to send a signal to the blowing agent delivery system to move the piston to the first position to set the enclosed volume of the chamber equal to the pre-determined volume and to move the piston to the second position at a rate coupled to the flow rate of polymeric material.

Another aspect of the invention provides a system. The system includes a blowing agent chamber, fluidly connectable to a blowing agent port in a polymer processing apparatus. The polymer processing apparatus is constructed and arranged to include a screw mounted in a barrel. The screw is rotatable as polymeric material flows at a flow rate in a downstream direction within a polymer processing space defined between the screw and the barrel. The chamber has a variable volume and is constructed and arranged to confine a fixed amount of blowing agent therein. The system is constructed and arranged to reduce the chamber volume at a rate coupled to the flow rate of polymeric material.

Another aspect of the invention provides a system. The system includes a blowing agent chamber, fluidly connectable to a blowing agent port in a polymer processing apparatus. The polymer processing apparatus is constructed and arranged to include a screw mounted in a barrel. The screw is rotatable as polymeric material flows at a flow rate in a downstream direction within a polymer processing space defined between the screw and the barrel. The system further includes a controller connectable to the blowing agent chamber, constructed and arranged to reduce the chamber volume at a rate coupled to the flow rate of polymeric material.

Another aspect of the invention provides a method of introducing blowing agent into a polymer processing system. The method includes arranging a polymer processing system to, in a repetitive cycle, plasticate polymeric material within an extruder and eject an accumulated mixture of polymeric material and blowing agent through an outlet. The method further includes accumulating a pre-determined mass of blowing agent in a chamber of a blowing agent delivery system. The method further includes introducing the pre-determined mass of blowing agent from the chamber through a blowing agent port in the extruder into the polymeric material, during a plastication period of the cycle, at a rate coupled to the flow rate of the polymeric material in the extruder.

Among other advantages, the blowing agent injection system can introduce blowing agent discontinuously into a discontinuous polymer processing system. The rate of blowing agent introduction may be coupled to the flow rate of polymeric material in the extruder when polymeric material is being plasticated. When polymeric material is not being plasticated, the delivery system does not introduce blowing agent into the polymeric material in the extruder. As a result, an even distribution of a selected amount of blowing agent in the polymeric melt, for example based on the weight of polymeric material, may be achieved. The delivery system, thus, significantly reduces or eliminates viscosity variations of the polymeric material and blowing agent mixture which may arise in conventional blowing agent delivery systems that continuously introduce blowing agent into a discontinuous processing system.

The blowing agent injection systems according to the invention are particularly useful in processes that benefit from the precise control of the metering of blowing agent into the polymeric melt, such as certain processes for producing microcellular materials. In particular, microcellular materials having an average cell size of less than 100 microns may be produced using the blowing agent delivery system in conjunction with injection molding or blow molding processes. Furthermore, the blowing agent delivery system has a simple design and may be produced relatively inexpensively.

Other advantages, aspects, and features of the invention will become apparent from the following detailed description when considered in conjunction with the accompanying drawings.

DETAILED DESCRIPTION

The invention provides a blowing agent delivery system and a method for delivering blowing agent in polymeric foam material processes. The delivery system may be used, for example, to introduce blowing agent during discontinuous polymer processes, such as injection molding or blow molding processes. Such discontinuous polymer processes are typically cyclical and include a plastication period, in which the screw rotates, followed by a period in which the screw does not rotate. As described further below, the blowing agent delivery system is designed to introduce blowing agent during plastication periods, but not during periods in which the screw does not rotate.

Figure 1:
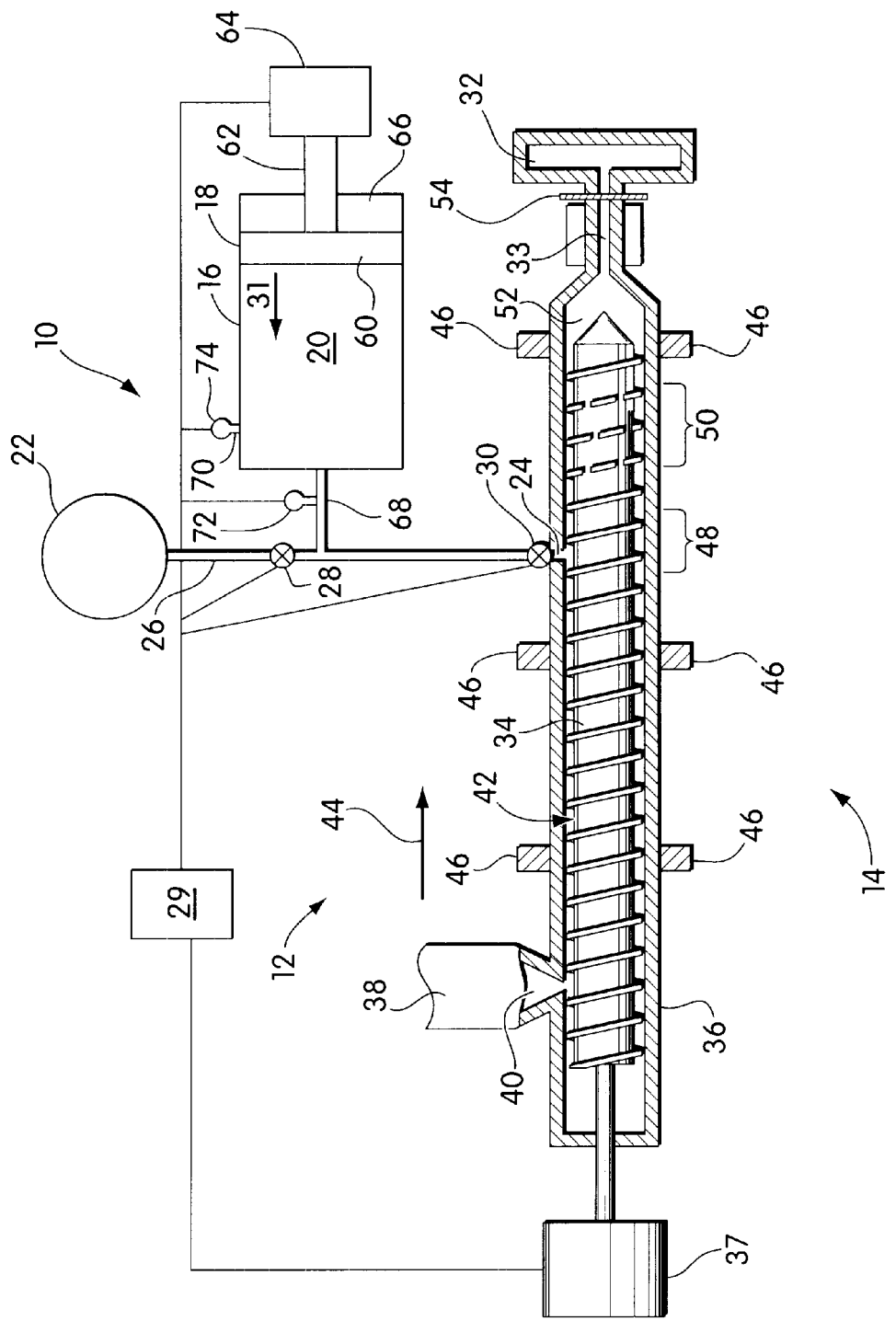
FIG. 1 schematically illustrates one embodiment of a blowing agent delivery system according to the invention with a fixed amount of blowing agent confined in a chamber of the delivery system prior to the introduction of the blowing agent into polymeric material in an extruder of an injection molding system.
Figure 2:
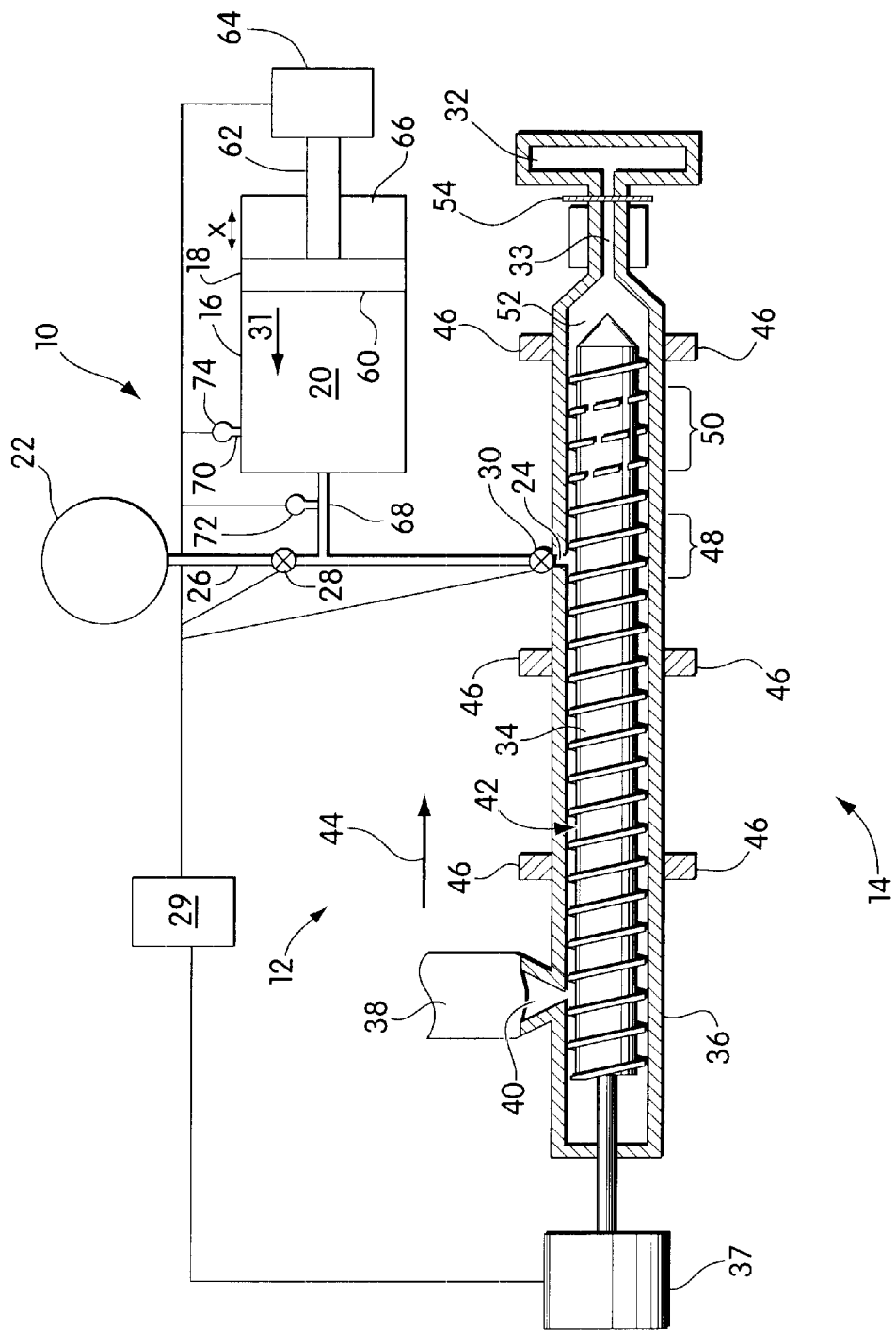
FIG. 2 schematically illustrates the blowing agent delivery system of FIG. 1 with the fixed amount of blowing agent pressurized in the chamber prior to the introduction of the blowing agent into polymeric material in the extruder.
Figure 3:
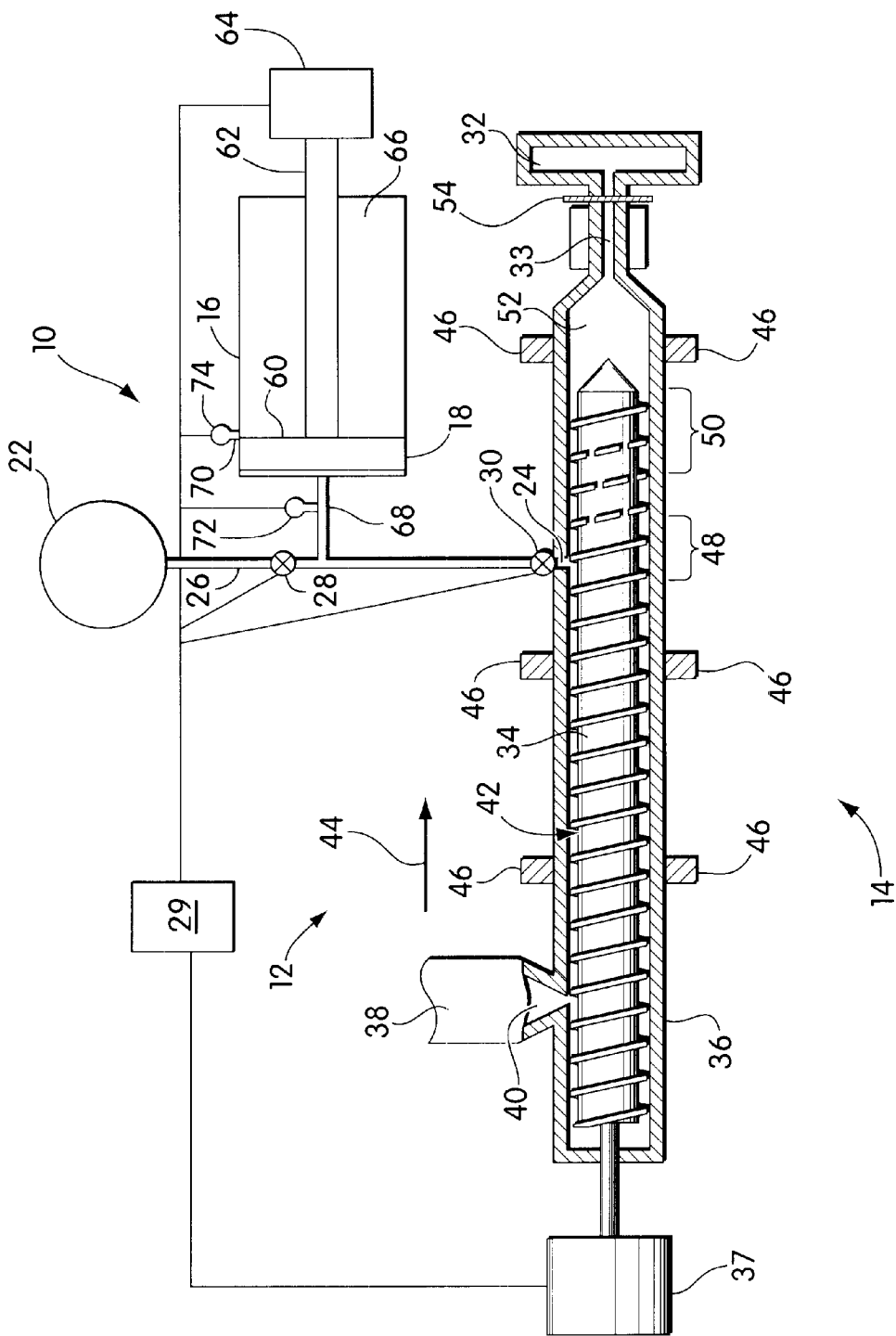
FIG. 3 schematically illustrates the blowing agent delivery system of FIG. 1 after the fixed amount of blowing agent is introduced into polymeric material in the extruder.

Referring to FIGS. 1–3, one illustrative embodiment of a blowing agent delivery system according to the invention is shown connected to an extruder 12 of an injection molding system 14. The blowing agent delivery system includes a chamber 16 having a moveable piston 18 mounted therein to define a variable internal volume 20 in which blowing agent is confined. The chamber is connected to a blowing agent source 22 and to a blowing agent port 24 in the injection molding system via conduit 26. A first shut-off valve 28 is positioned between the blowing agent source and the chamber and controls the flow of blowing agent into the chamber and a second shut-off valve 30 is positioned between the chamber and the blowing agent port and controls the flow of blowing agent through the blowing agent port. The blowing agent delivery system may optionally include a controller 29 which, as described further below, may receive input signals from and send output signals to one or more components of delivery system 10 and injection molding system 14 to control the operation of the delivery system.

Injection molding system 14 may be any suitable type known in the art. Examples of suitable injection molding systems have been described, for example, in International Publication No. WO 98/31521 (Pierick et. al.) which is incorporated herein by reference. In this illustrative embodiment, the injection molding system includes extruder 12 having an outlet 33 fluidly connected to an injection mold 32. The extruder includes a polymer processing screw 34 that is mounted within a barrel 36. Polymer processing screw may be rotated and moved axially in a downstream direction, for example, by a motor 37. Polymeric material, typically in pelletized form, is fed into barrel 36 from a hopper 38 through an orifice 40. Screw 34 and barrel 36 define therebetween a polymer processing space 42 in which polymeric material is conveyed in a downstream direction 44 during the plastication period of the cycle by the rotation of the screw. Barrel 36 may be equipped with temperature control units 46 at selective positions along the length of the barrel. Temperature control units 46 may be used to heat the barrel, for example to facilitate melting of pelletized polymeric material, or cool the barrel, for example to increase the viscosity of the polymeric melt. Extruder 12 may also include measurement instruments (not shown) such as thermocouples and pressure transducers to monitor, respectively, the temperature and pressure of the polymeric material at various locations along the length of the barrel.

The operation of the blowing agent delivery system may be coupled to the injection molding cycle. At the beginning of a typical molding cycle as shown in FIG. 1, a selected amount of blowing agent is confined in internal volume 20 of chamber 16 and screw 34 is positioned at a downstream end of barrel 36. Screw 34 begins to rotate within barrel 36 to plasticate polymeric material. Piston 18 moves in direction 31 to decrease internal volume 20 of the chamber and second shut-off valve 30 is opened to force blowing agent through blowing agent port 24 and into the polymeric material in processing space 42 to form a mixture of polymeric material and blowing agent in the extruder. The opening of second shut-off valve 30, the start of piston motion, and the start of screw rotation may all be coupled to one another, for example, by controller 29. In certain embodiments, one or more of these events may occur simultaneously. In other embodiments, as described further below, a short time lag may be separate one or more of these events. For example, as described further below, piston 18 may be moved a distance x from its initial position (FIG. 1) to an intermediate position (FIG. 2) to compress the blowing agent prior to opening the second shut-off valve and introducing the blowing agent into the extruder.

Piston 18 continues to move in direction 31, while screw 34 rotates within barrel 36. In some embodiments, the rate of motion of piston 18 is coupled to the flow rate of polymeric material to create a mixture of blowing agent and polymeric having the desired weight percentage of blowing agent. The polymeric material and blowing agent mixture is conveyed downstream by the rotating screw and accumulated in a region 52 within the barrel downstream of the screw. The accumulation of the mixture in region 52 creates a pressure that forces the screw axially in an upstream direction in the barrel. In some embodiments, the rate of motion of piston 18 may be coupled to the rate of axial screw motion to create a mixture having the desired weight percentage of blowing agent.

After a sufficient charge (or shot) of the mixture has been accumulated, screw 34 ceases to rotate and second shut-off valve 30 is closed to prevent further introduction of blowing agent into the polymeric material. Preferably, the motion of piston 18 may be timed so that the piston reaches the end of its travel within chamber 16 when the screw ceases to rotate (See FIG. 3). That is, at the end of the plastication period piston 18 has reduced internal volume 20 of chamber 16 essentially to zero. Thus, in these cases, the entire amount of blowing agent accumulated in chamber 16 is introduced into the polymeric material throughout the plastication period. In some embodiments, the closing of second shut-off valve 30, the end of screw rotation, and the end of piston motion may be coupled to one another, for example, by controller 29.

Then, screw 34 is moved axially in a downstream direction to the position illustrated in FIG. 1 to inject the accumulated charge through outlet 33 of the extruder and into mold. A valve 54 associated with the outlet of the extruder typically is opened to permit the mixture to flow into the mold. The mixture of polymeric material and blowing agent is cooled in the mold, after which the mold is opened to produce an injection molded foam part. In preferred microcellular embodiments, as described in International Patent Publication No. WO 98/31521, a homogeneous, single-phase solution of polymeric material and blowing agent is accumulated in region 52 and is nucleated as the charge is injected into the mold. In some preferred embodiments, a molded microcellular article is formed within the mold. In some embodiments, the microcellular articles have an average cell size of less than 100 microns, in other embodiments less than 50 microns, in other embodiments less than 25 microns, in other embodiments less than 5 microns, in other embodiments, even smaller cell sizes are achievable.

After second shut-off valve 30 is closed, first shut-off valve 26 may be opened to permit blowing agent to flow from source 22 and into chamber 16. The operation of the shut-off valves may be coupled to one another, for example, by controller 29. In some embodiments, the flow of blowing agent forces piston 18 from its position in FIG. 3 to its position in FIG. 1, thus, expanding internal volume 20 as blowing agent is accumulated. In other embodiments, piston 18 may be moved backwards by other forces to create an internal volume 20 in which blowing agent may be accumulated. In either set of embodiments, piston 18 may move to a specific position to define a specific internal volume 20 for blowing agent to be accumulated, as described further below. After the selected amount of blowing agent is accumulated, first shut-off valve 26 is closed and the above-described process may be repeated to produce additional molded foam articles.

Figure 4:
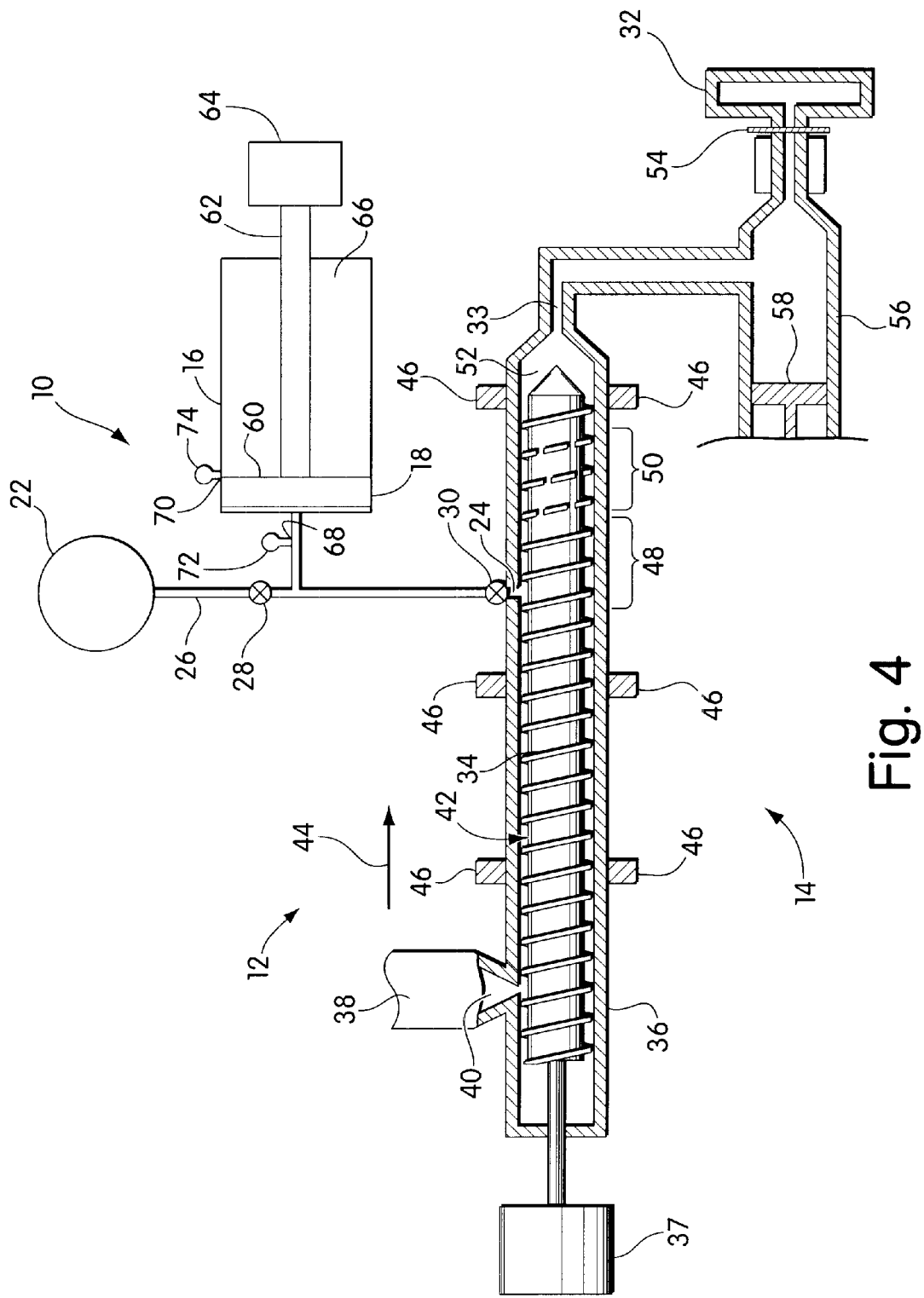
FIG. 4 schematically illustrates a blowing agent delivery system used to introduce blowing agent into an extruder of an injection molding system that includes a piston and accumulator.

In another embodiment of the invention as illustrated in FIG. 4, a separate accumulator 56, external of the extruder, is fluidly connected to outlet 33 of barrel 36. A charge of the mixture of polymeric material and blowing agent, preferably a homogeneous, single-phase solution, is accumulated within accumulator 56 during the plastication period of the molding cycle. The accumulated charge is injected into mold 32 by the downstream motion of a plunger 58 housed within the accumulator.

Though blowing agent delivery system 10 is illustrated in conjunction with an injection molding system, it is to be understood that the blowing agent delivery system according to the invention may be used in conjunction with other polymer processing systems including other discontinuous systems and, in particular, blow molding systems. Examples of suitable blow molding systems have been described, for example, in International Publication No. WO 99/32544 (Anderson et. al.) which is incorporated herein by reference. In blow molding embodiments, microcellular material can be produced by accumulating a homogeneous, single-phase solution of polymeric material and blowing agent in region 52 and nucleating the solution while ejecting the charge from the region through an annular orifice forming a microcellular parison.

Generally, a fixed mass of blowing agent is accumulated in chamber 16 when first shut-off valve 28 is open. The fixed mass may be selected based on a number of factors including: the flow rate of polymeric material in the extruder, the desired weight percentage of blowing agent in the mixture of polymeric material and blowing agent, the shot size (mass of the charge of polymeric material injected into the mold during a given cycle) or duration of the plastication period. In some embodiments, piston 18 is moved to a desired initial position (FIG. 1) to define a specific internal volume 20 to be occupied by the fixed mass of blowing agent. The internal volume may correspond to the volume occupied by the selected fixed mass of blowing agent at the temperature and pressure conditions of chamber 16 as calculated by the ideal gas law, as described further below.

In embodiments when piston 18 is moved from its initial position to an intermediate position (FIG. 2) to compress the blowing agent confined in the chamber (and in the conduit between the first shut-off valve and the second shut-off valve), the blowing agent is preferably compressed until its pressure is approximately equal to the value of the pressure of the polymeric material in the extruder in the vicinity of blowing agent port 24. The pressure in the extruder may be measured using a pressure transducer (not shown). When the pressure of the blowing agent in the system is approximately equal to the pressure of polymeric material in the extruder, the flow rate of blowing agent into the polymeric material after the second shut-off valve 30 is opened is not dictated by pressure differences but, rather, is controlled by the rate of piston motion. This permits accurate and consistent delivery throughout the plastication time period.

Figure 5:
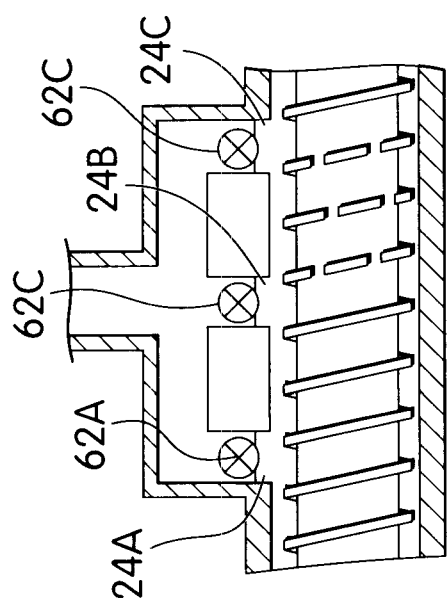
FIG. 5 schematically illustrates a section of an extruder barrel including multiple blowing agent ports connected to a conduit of a blowing agent delivery system according to one embodiment of the invention.

Blowing agent port 24 is formed in barrel 36 of the extruder at a location where the polymeric material is generally in a fluid state. The blowing agent port connects the blowing agent delivery system to the polymeric material in polymer processing space 42. Blowing agent port 24 may be a single port or a plurality of ports arranged in the barrel. When multiple ports are utilized, ports can be arranged radially about the barrel or in a linear fashion along the length of the barrel (FIG. 5). As shown in FIG. 5, an arrangement of ports 24a, 24b, 24c along the length of the barrel can facilitate injection of blowing agent at a relatively constant location relative to the screw when the screw moves axially (in an upstream direction) within the barrel as the mixture of polymeric material and blowing agent is accumulated. Where radially-arranged ports are used, a plurality of ports 24 may be placed at the 12:00 o'clock, 3:00 o'clock, 6:00 o'clock and 9:00 o'clock positions about the extruder barrel, or in any other configuration as desired.

Blowing agent port 24 may include a single orifice or a plurality of orifices. In the multi-orifice embodiments (not illustrated), the port may include at least about 2, and some cases at least about 4, and others at least about 10, and others at least about 40, and others at least about 100, and others at least about 300, and others at least about 500, and in still others at least about 700 blowing agent orifices. In another embodiment, port 24 includes an orifice containing a porous material that permits blowing agent to flow therethrough and into the barrel, without the need to machine a plurality of individual orifices.

In certain preferred embodiments, blowing agent port 24 may be located at a blowing agent injection section 48 of the screw during the plastication period of the cycle. The blowing agent injection section of the screw may include full, unbroken flight paths. In this manner, each flight, passes or "wipes" the blowing agent port including orifices periodically, when the screw is rotating. This wiping increases rapid mixing of blowing agent and polymeric material in the extruder the result is a distribution of relatively finely divided, isolated regions of blowing agent in the polymeric material immediately upon injection into the barrel and prior to any mixing. This promotes formation of a uniform polymer and blowing agent mixture which may be desired in certain types of polymeric processing including microcellular processing. Downstream of the blowing agent injection section, the screw may include a mixing section 50 which has highly broken flights to further mix the polymer and blowing agent mixture to promote formation of a uniform mixture within the extruder. A preferred uniform mixture is a homogeneous, single-phase solution.

In certain blowing agent delivery systems, chamber 16 has a volume of less than 1 liter, in some systems less than 0.5 liters, and in some systems less than 0.25 liters or even smaller. Chamber 16 is illustrated as having a single orifice functioning as an inlet for blowing agent flow into the chamber and outlet for blowing agent flow from the chamber. However, it should be understood that in some embodiments the blowing agent inlet and outlet may be located in separate positions.

Generally, piston 18 includes a portion having a cross-sectional area similar to the cross-sectional area of the inner diameter of the chamber. As illustrated, the chamber has a circular cross-section and the piston includes a disc portion 60 attached to a distal end of an arm portion 62, however other configurations of the piston and chamber assembly may be possible. Disc portion 60 of piston 18 creates a seal with the inner diameter of the chamber which prevents leakage of blowing agent past the piston and confines the blowing agent to internal volume within the chamber. The seal between the piston and the chamber may be any of the type used in the art which sufficiently prevents blowing agent leakage, while permitting motion of the piston. In some embodiments, suitable seals may be achieved using o-rings or cap rings between the piston and chamber.

Piston 18 may be moved in a number of ways to vary internal volume 20 of chamber 16. In the illustrative embodiment, piston 18 is actuated by a motor 64 attached to a proximal end of arm portion 62. In some embodiments, for example when precise control of piston position is desired, the arm portion of the piston may be a screw which is rotated by the motor to actuate the piston and, thus, may not utilize motor 64. In other embodiments (not illustrated), the motion of the piston may be controlled by pressure differences within the chamber on either side of the piston. In such embodiments, for example, the chamber may contain a viscous fluid, such as oil, in a region 66 behind the piston. The position of the piston depends upon the pressure of the blowing agent confined in the chamber relative to the pressure of the viscous fluid in region 66.

Source 22 is capable of containing a larger volume of blowing agent than chamber 16. Thus, a single source 22 may be used to refill chamber 16 multiple times. The source may supply any type of physical blowing agent known to those of ordinary skill in the art including nitrogen, carbon dioxide, hydrocarbons, chlorofluorocarbons, noble gases and the like, or mixtures thereof. The blowing agent may be supplied to the chamber in any flowable physical state, for example, a gas, liquid, or supercritical fluid. According to one preferred embodiment, source 22 provides carbon dioxide as a blowing agent. In another preferred embodiment, the source provides nitrogen as a blowing agent. In certain embodiments, solely carbon dioxide or nitrogen may be supplied by the source. Blowing agents that are in the supercritical fluid state after injection into the extruder (and, optionally, before injection as well), in particular supercritical carbon dioxide and supercritical nitrogen, are especially preferred in certain embodiments.

Blowing agent delivery system 10 may be used to introduce blowing agent into polymeric material within extruder 12 during the plastication time period over a wide range of flow rates as required by the particular process. For example, the blowing agent mass flow rate is generally between 0.001 lbs/hr and about 100 lbs./hr, in some cases between about 0.002 lbs./hr and 60 lbs./hr, and in some cases between about 0.02 lbs./hr and about 10 lbs./hr. In some embodiments, the blowing agent mass flow rate is constant over the plastication time period. The blowing agent is typically introduced into the polymeric material on the extruder so as to maintain a desired weight percentage of blowing agent by weight of polymeric material and blowing agent mixture formed in the extruder. The desired blowing agent percentage depends upon the particular process and is generally less than about 15% by weight of polymeric material and blowing agent. In many embodiments, the blowing agent level is less than about 8%, in others less than about 5%, in others less than about 3%, in others less than about 1%, and still others less than about 0.1% or even lower by weight of polymeric material and blowing agent mixture.

Conduits 26 of the blowing agent delivery system may be any of the kind known in the art suitable for transporting a blowing agent. For example, conduits 26 may be a tube made of a suitable material for transporting pressurized gas, liquefied gas, and/or supercritical fluid, such as a metal tube, preferably made of stainless steel. The conduits also may be defined by passageways within a block of material, such as drilled passageways within a block of metal such as stainless steel. The blowing agent conduits typically have a cross-sectional diameter between about 0.1 mm and about 1.0 cm, though other dimensions are possible. The length and configuration of conduits 26 are not constrained and generally depend upon factors such as available manufacturing space, and the layout of the blowing agent delivery system and injection molding system. In some embodiments, it may be desirable to reduce or minimize the volume of conduits to ensure that excess blowing agent confined within the conduit does not significantly effect the process. The conduit assembly, in some embodiments and as illustrated, may have one or more branches, for example, to facilitate connection to chamber 16 or to provide connection to multiple blowing agent ports (FIG. 5).

First and second shut-off valves 28, 30 may be any device in the art that selectively permits flow of pressurized gas, liquefied gas, or supercritical fluid therethrough in one configuration, and prevents flow of these fluids therethrough in another configuration. Suitable types of valves include solenoid, spool or other equivalent valves. In some cases, valves 28 and may be the same type, while in other cases the valves may be of different types. In the illustrative embodiment, first shut-off valve 28 is positioned near the inlet/outlet of chamber 16. In some cases, the illustrative arrangement may be preferred to minimize the volume of blowing agent that may be confined in the conduit between the inlet/outlet of chamber 16 and first shut-off valve 28. However, it is to be understood that the position of the first shut-off valve 28 may be anywhere along the fluid pathway between blowing agent source 22 and chamber 16 so as to control the flow of blowing agent into the chamber. In the illustrative embodiment, the second shut-off valve 30 is positioned near or essentially adjacent to blowing agent port 24. In some cases, the illustrative arrangement may be preferred to minimize the volume of blowing agent that may be confined in the conduit between second shut-off valve 28 and port 24. However, it is to be understood that the position of the second shut-off valve 30 may be anywhere along the fluid pathway between chamber 16 and blowing agent port 24 so as to control the flow of blowing agent to the blowing agent port. Second shut-off valve 30, in some preferred embodiments, may be of the type described in commonly-owned, co-pending U.S. provisional patent application serial No. 60/187,530, entitled "Blowing Agent Delivery System", filed Mar. 7, 2000.

In the multi-axial port embodiment illustrated in FIG. 5, separate shut-off valves 62a, 62b, 62c may be provided at each blowing agent port 24a, 24b, 24c. Shut-off valves 62a, 62b, 62c can be individually opened and closed, during the plastication time period, so as to control injection of blowing agent at desired location relative to the position of the screw, for example, to ensure that blowing agent is introduced at blowing agent injection section 56 of the screw. In the illustrative embodiment, each blowing agent port is connected to the same blowing agent delivery system. However, it should be understood that in some embodiments, each blowing agent port may be connected to a single blowing agent delivery system.

In some embodiments, blowing agent delivery system 10 is designed to measure the temperature and the pressure of the blowing agent to be confined. Such measurements may be used, for example, by controller 29 to set certain system parameters such as internal volume 20 as described further below. In these embodiments, the delivery system may include instrument ports 68, 70 through which a pressure transducer 72 and a thermocouple 74 may be inserted to measure the pressure and temperature of the blowing agent, respectively. The instrument ports may be provided in chamber 16 or in a section of conduit 26 proximate to the chamber which experiences similar pressure and/or temperature conditions as the chamber, such as between the chamber and second shut-off valve 30. In some cases and as shown, one or more of the instrument ports are preferably located in the section of conduit between the chamber and second shut-off valve 30 to provide measurements when relatively little amount of blowing agent is confined in chamber 16.

In some embodiments, the delivery system may utilize controller 29 to receive inputs from pressure transducer 72 and thermocouple 74 related, respectively, to the pressure and temperature of the blowing agent in the chamber. The controller may also receive manual inputs related to the selected fixed mass of the blowing agent to be confined in the chamber; or, alternatively may calculate the selected mass of the blowing agent to be confined in the chamber from other inputs which may include the shot size and the desired blowing agent percentage of the blowing agent and polymeric material mixture. The controller may be configured to calculate the volume of the blowing agent to be confined in the chamber using the ideal gas law from the inputs of the temperature, pressure and selected mass of the blowing agent. In some cases, the controller sends an output signal, for example to the motor, to move piston 18 to an appropriate position which defines internal volume 20 of chamber 16 equal to the volume that is calculated using the gas law.

In some embodiments, controller 29 may be used to set the position of piston 18 when compressing the blowing agent in chamber 16 (FIG. 2). In these embodiments, the controller may receive inputs, for example from a pressure transducer, related to the pressure in the extruder in the vicinity of blowing agent injection port 24. Controller 29 may also receive an input of the pressure in chamber 16 from pressure transducer 72. The controller may send a signal, for example to motor 64, to move the piston to a position at which the pressure of blowing agent in the chamber is equal to or approximately equal to the pressure of polymeric material in the extruder in the vicinity of the blowing agent port.

In one preferred set of embodiments, controller 29 may control the rate of blowing agent introduction into the polymeric material in the extruder by coupling the motion of piston 18 to the flow rate of polymeric material in the extruder or, in other cases, the axial upstream motion of the screw. In these embodiments, the controller receives inputs from the extruder related to the flow rate of polymeric material or the axial upstream motion of the screw during plastication. The controller may also receive manual inputs of the desired blowing agent percentage in the mixture of polymer and blowing and the desired mass of the accumulated charge (shot size). The controller processes the inputs and sends an output signal to control the speed of piston 18 to introduce blowing agent into the mixture at a desired rate so as to form a mixture having the desired blowing agent percentage.

Those skilled in the art would readily appreciate that all parameters listed herein are meant to be exemplary and that actual parameters would depend upon the specific application for which the delivery systems of the invention are used. It is, therefore, to be understood that the foregoing embodiments are presented by way of example only and that, within the scope of the appended claims and equivalents thereto, the invention may be practiced otherwise than as specifically described.

What is claimed is:

1. A polymeric foam processing system operable to, in a repetitive cycle, plasticate polymeric material and eject an accumulated mixture of polymeric material and blowing agent through an outlet, the system comprising:

an extruder having a polymer processing screw constructed and arranged to rotate within a barrel, during a plastication period of the cycle, to convey polymeric material in a downstream direction at a flow rate within a polymer processing space defined between the screw and the barrel, the extruder including a blowing agent port formed in the barrel;

a blowing agent delivery system having an outlet fluidly connected to the blowing agent port, the blowing agent delivery system including a chamber designed to confine a fixed mass of blowing agent in an enclosed volume and a piston mounted within the chamber, the piston defining, in part, the enclosed volume of the chamber, and moveable from a first position to a second position to force blowing agent through the outlet of the chamber and the blowing agent port and into the polymeric material, during the plastication period, to form a mixture of polymeric material and blowing agent in the polymer processing space, the blowing agent delivery system being equipped to measure temperature and pressure of the blowing agent confined in the chamber; and a controller in communication with the blowing agent delivery system, the controller designed to receive the inputs of the temperature and pressure of the blowing agent confined in the chamber from the blowing agent delivery system, and an input of a pre-determined mass of blowing agent, the controller being capable of calculating a pre-determined volume of blowing agent from the inputs, the controller designed to send a signal to the blowing agent delivery system to move the piston to the first position to set the enclosed volume of the chamber equal to the pre-determined volume and to move the piston to the second position at a rate coupled to the flow rate of polymeric material.

2. The polymeric foam processing system of claim 1, wherein the piston moves from a first position to an intermediate position to pressurize the fixed mass of blowing agent confined in the chamber, and from the intermediate position to a second position to force blowing agent through an outlet of the chamber.

3. The polymeric foam processing system of claim 2, wherein the piston, when in the intermediate position, pressurizes the fixed amount of blowing agent in the chamber to a pressure approximately equal to the pressure of polymeric material in the polymer processing space in the vicinity of the blowing agent port.

4. The polymeric foam processing system of claim 1, wherein the blowing agent delivery system includes a first valve positioned between an outlet of the chamber and the blowing agent port, the first valve being moveable between an open configuration that permits flow of blowing agent to the blowing agent port and a closed configuration that prevents flow of blowing agent to the blowing agent port.

5. The polymeric foam processing system of claim 4, wherein the first valve has a closed configuration when the piston moves from the first position to the intermediate position.

6. The polymeric foam processing system of claim 4, wherein the first valve moves to the open configuration when the screw is in a pre-determined position.

7. The polymeric foam processing system of claim 1, wherein the piston moves to the second position to force blowing agent through an outlet of the chamber at a rate coupled to the axial speed of the screw during the plastication period.

8. The polymeric foam processing system of claim 1, wherein the piston forces essentially all of the fixed amount blowing agent through an outlet of the chamber.

9. The polymeric foam processing system of claim 1, wherein the mass flow rate of blowing agent into the polymeric material is essentially constant during the plastication period of the cycle.

10. The polymeric foam processing system of claim 1, wherein the chamber has an inlet connectable to a source of blowing agent.

11. The polymer foam processing system of claim 10, further comprising a second valve positioned between the inlet and the source of blowing agent, the valve being moveable between an open configuration that permits flow of blowing agent to the inlet of the chamber and a closed configuration that prevents flow of blowing agent to the inlet of the chamber.

12. The polymeric foam processing system of claim 1, wherein the polymer processing screw reciprocates between a first position, in which a mixture of polymeric material and blowing agent is accumulated downstream of the screw, and a second position in which the mixture of polymeric material and blowing agent is ejected through an outlet of the extruder.

13. The polymeric foam processing system of claim 1, further comprising an accumulator fluidly connected to an outlet of the extruder and a reciprocating plunger mounted within the accumulator, the plunger being moveable between a first position, in which the mixture of polymeric material and blowing agent is accumulated in the accumulator, and a second position in which the accumulated mixture of polymeric material and blowing agent is ejected through an outlet of the accumulator.

14. The polymeric foam processing system of claim 1, further comprising an injection mold fluidly connected to an outlet of the extruder and constructed to receive the mixture of polymeric material and blowing agent.

15. The polymeric foam processing system of claim 1, further comprising:

a blow molding forming die fluidly connected to the outlet of the extruder and having an outlet designed to release a parison comprising the mixture of polymeric material and blowing agent; and a blow mold positionable to receive the parison from the outlet of the die.

16. The polymeric foam processing system of claim 1, wherein the screw, in a first mode off operation rotates and, in a second mode of operation, ceases to rotate.

17. The polymeric foam processing system of claim 16, wherein, during the second mode of operation, the screw reciprocates between a first position in which the mixture of polymeric material and blowing agent is accumulated in a region in the barrel downstream of the screw and a second position in which the mixture of polymeric material and blowing agent is ejected through an outlet of the extruder.

18. The polymeric foam processing system of claim 16, wherein the first mode of operation and the second mode of operation occur in successive steps to define a cycle, the cycle being repeatable.

* * * * *